United States Patent
Hirst et al.

(10) Patent No.: US 6,581,166 B1
(45) Date of Patent: Jun. 17, 2003

(54) NETWORK FAULT DETECTION AND RECOVERY

(75) Inventors: Michael Hirst, Lakeville, MA (US); Douglas MacDougall, Plainville, MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/516,526

(22) Filed: Mar. 1, 2000

Related U.S. Application Data

(60) Provisional application No. 60/122,540, filed on Mar. 2, 1999.

(51) Int. Cl.[7] .................................................. H02H 3/05
(52) U.S. Cl. ............................................ 714/4; 714/43
(58) Field of Search ........................ 714/4, 43; 370/251

(56) References Cited

U.S. PATENT DOCUMENTS

| | | | |
|---|---|---|---|
| 4,692,918 A | 9/1987 | Elliott et al. | |
| 4,710,926 A | 12/1987 | Brown et al. | |
| 4,787,082 A | 11/1988 | Delaney et al. | |
| 4,964,120 A | 10/1990 | Mostashari | |
| 5,153,874 A | 10/1992 | Kohno | |
| 5,159,685 A | 10/1992 | Kung | |
| 5,200,949 A | * 4/1993 | Kobayashi | 370/228 |
| 5,218,600 A | 6/1993 | Schenkyr et al. | |
| 5,276,440 A | 1/1994 | Jolissaint et al. | |
| 5,329,521 A | 7/1994 | Walsh et al. | |
| 5,337,320 A | 8/1994 | Kung | |
| 5,341,496 A | 8/1994 | Middledorp et al. | |
| 5,390,326 A | 2/1995 | Shah | |
| 5,485,465 A | 1/1996 | Liu et al. | |
| 5,485,576 A | 1/1996 | Fee et al. | |
| 5,493,650 A | 2/1996 | Reinke et al. | |
| 5,508,997 A | 4/1996 | Katou | |
| 5,508,998 A | 4/1996 | Sha et al. | |
| 5,586,112 A | 12/1996 | Tabata | |
| 5,661,719 A | 8/1997 | Townsend et al. | |
| 5,675,723 A | 10/1997 | Ekrot et al. | |
| 5,680,437 A | 10/1997 | Segal | |
| 5,987,521 A | 11/1999 | Arrowood et al. | |
| 6,108,300 A | * 8/2000 | Coile et al. | 370/217 |
| 6,173,411 B1 | * 1/2001 | Hirst et al. | 714/4 |
| 6,282,669 B1 | * 8/2001 | Imanaka et al. | 714/4 |
| 6,308,282 B1 | * 10/2001 | Huang et al. | 714/4 |

OTHER PUBLICATIONS

Page on Hirschmann Industrial Ethernet Hubs from L-com Connectivity Products year 2000 Networking Supplement 1.0.

Page on LANCAST Redundant Networking Interface Cards (NICs) from L-com Connectivity Products year 2000 Networking Supplement 1.0.

* cited by examiner

Primary Examiner—Scott Baderman
Assistant Examiner—Joshua Lohn
(74) Attorney, Agent, or Firm—Leydig, Voit & Mayer, Ltd.

(57) ABSTRACT

A method of fault detection and recovery utilizes dual independent networks to provide fault-tolerance. These networks, a primary and alternate network, are utilized such that communications for a particular computer take place via that computer's preferred network by default. Faults are detected through the use of a heartbeat pinging mechanism to detect faults on the network itself and by periodic port integrity checks to detect port faults. The integrity of the non-default network and port are also periodically verified to assure effective fault recovery.

Upon detection of a fault, a packet routing table in the detecting computer is altered to set the detecting computer's default network to the previously non-default network. Additionally, a new gateway packet is transmitted which allows other network computers to modify their routing tables to communicate with the detecting computer over its current default network.

17 Claims, 18 Drawing Sheets

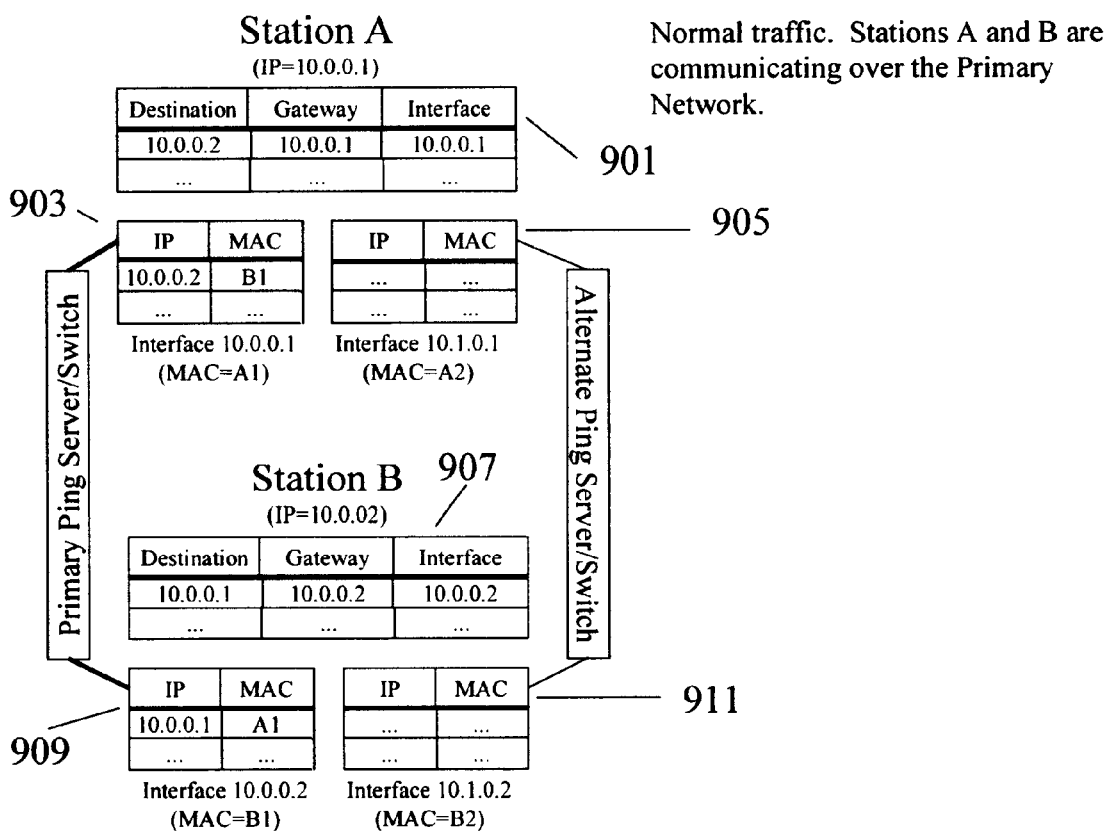
Figure 10(a) Normal Communication

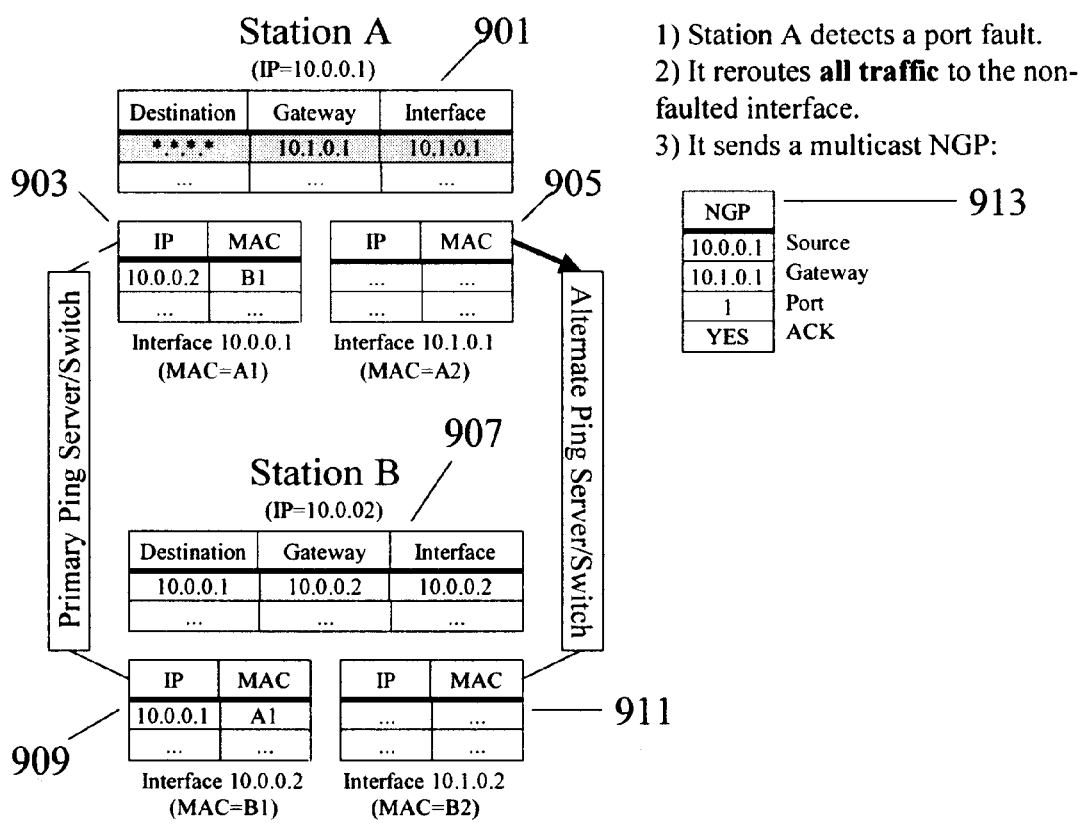
Figure 10(b) Responding to a Fault Detection

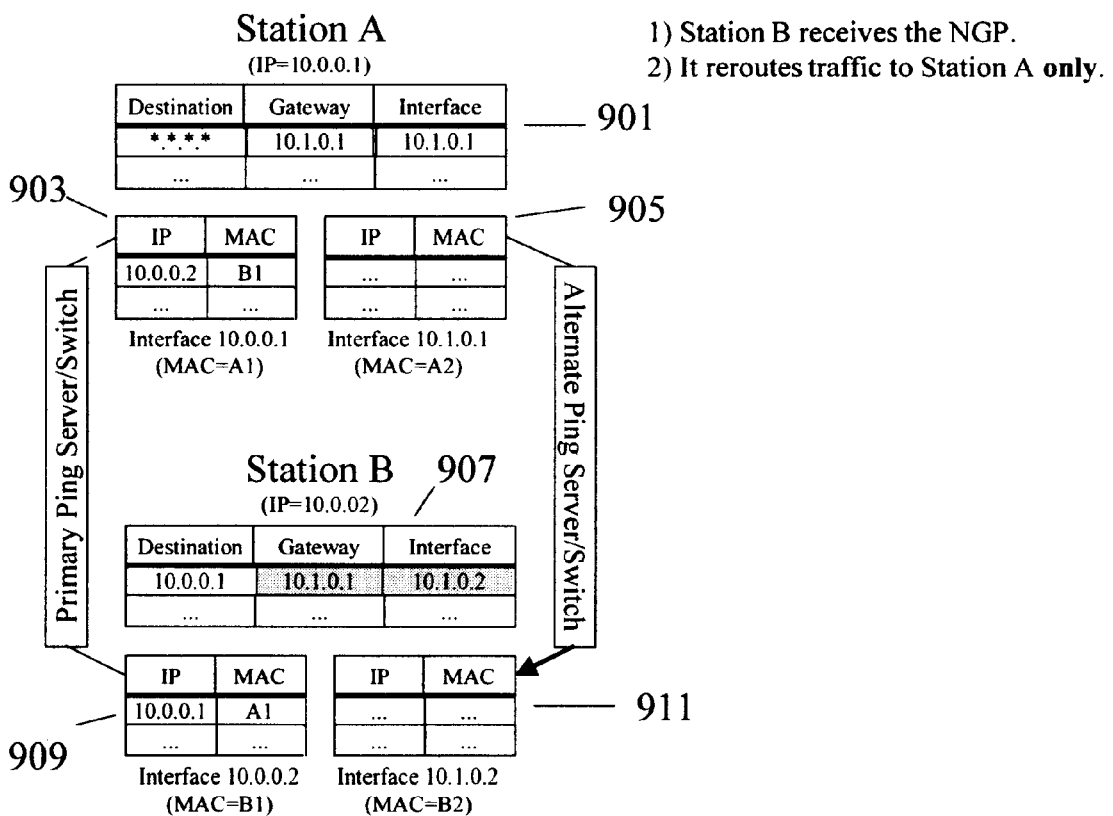
Figure 10(c) Responding to a multicast NGP

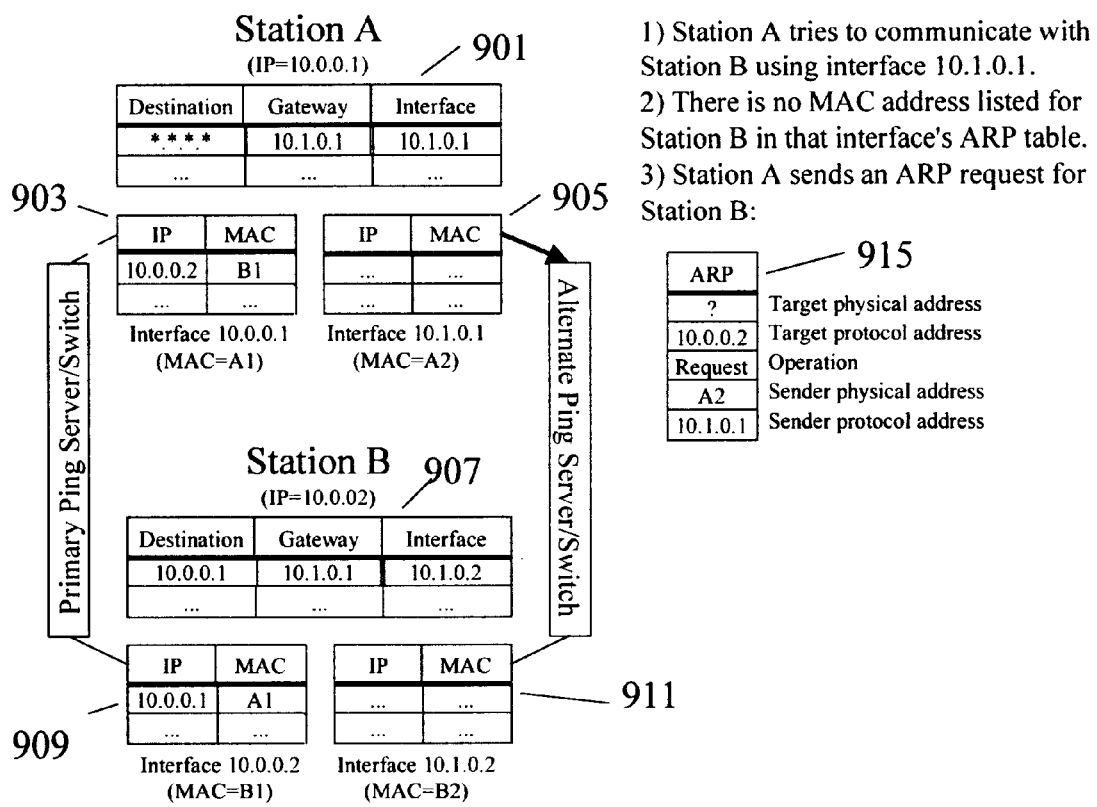
Figure 10(d) Sending an ARP Request

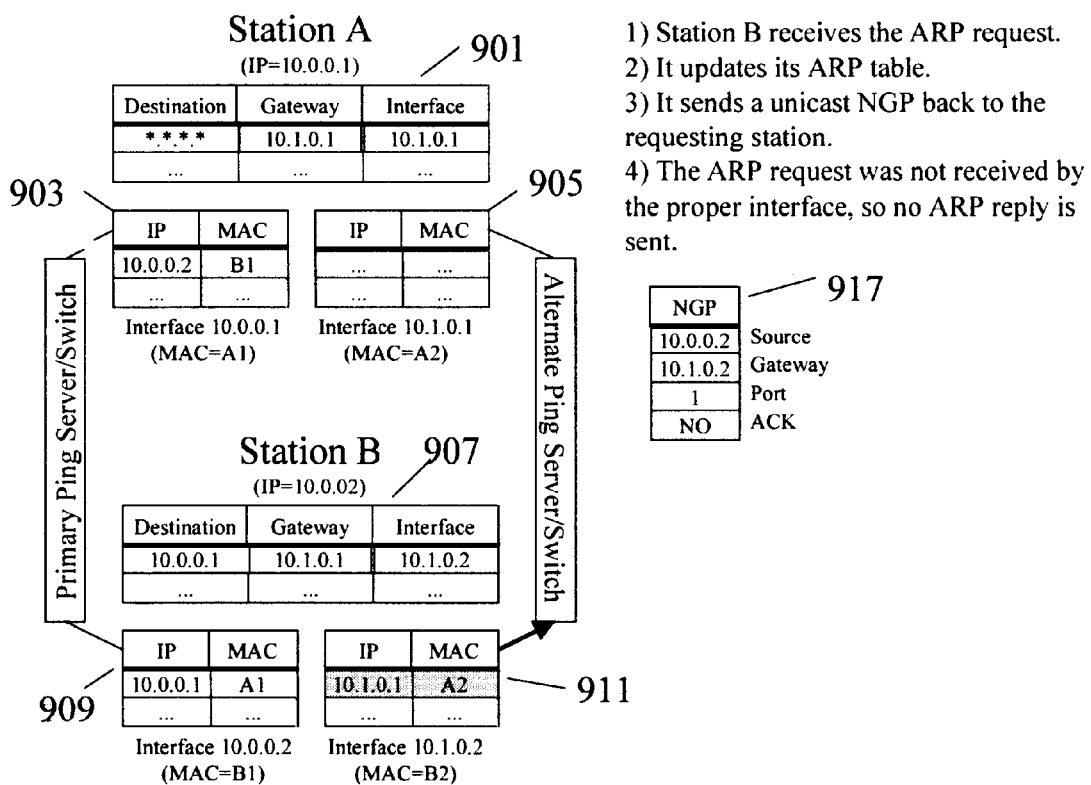
Figure 10(e) Correcting an ARP Request

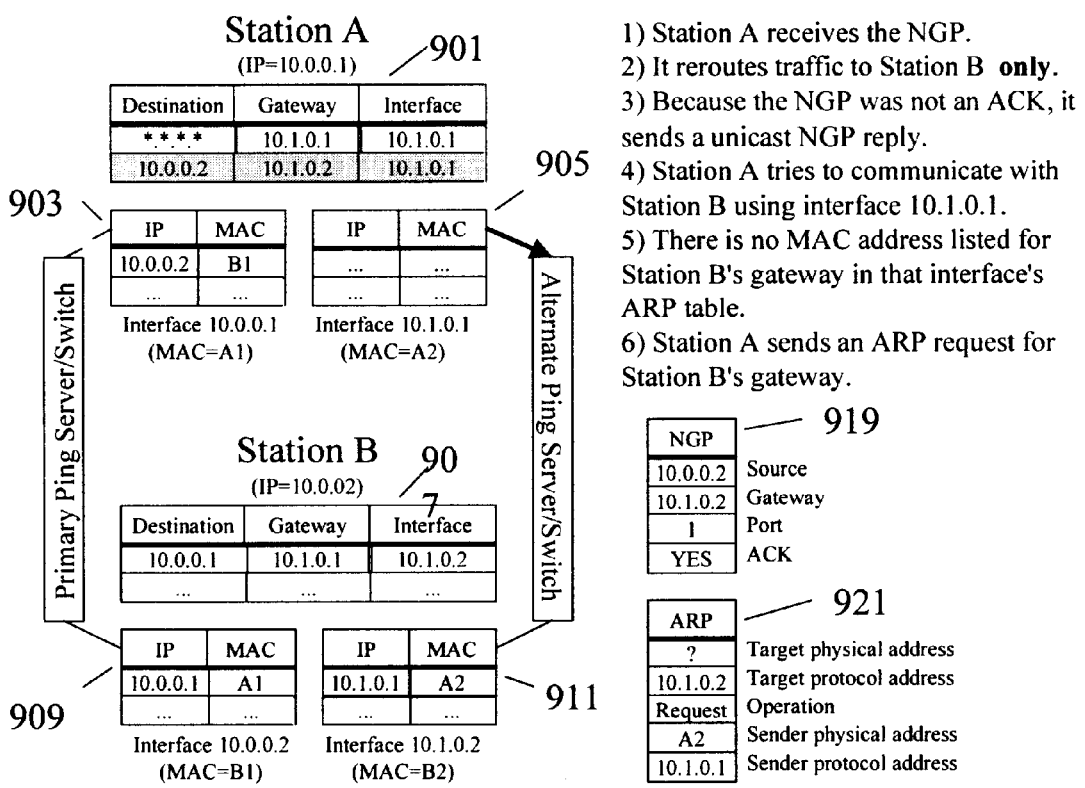
Figure 10(f) Sending a Corrected ARP Request

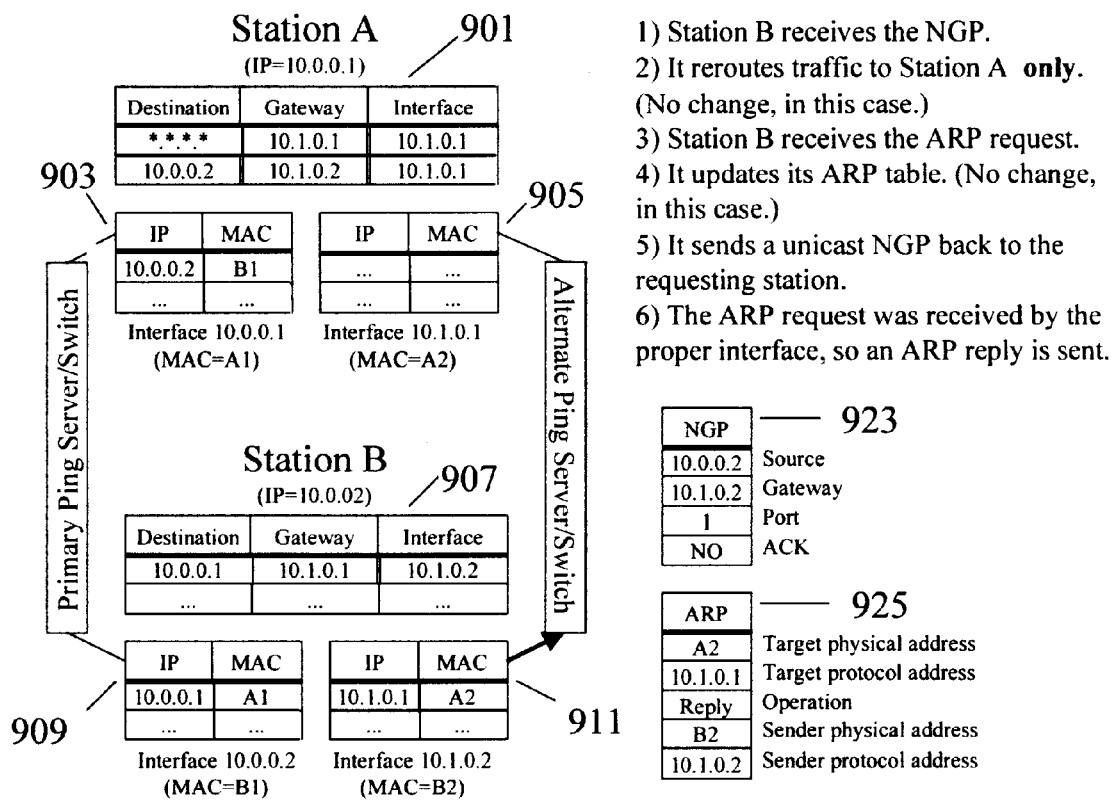
Figure 10(g) Responding to a Unicast NGP

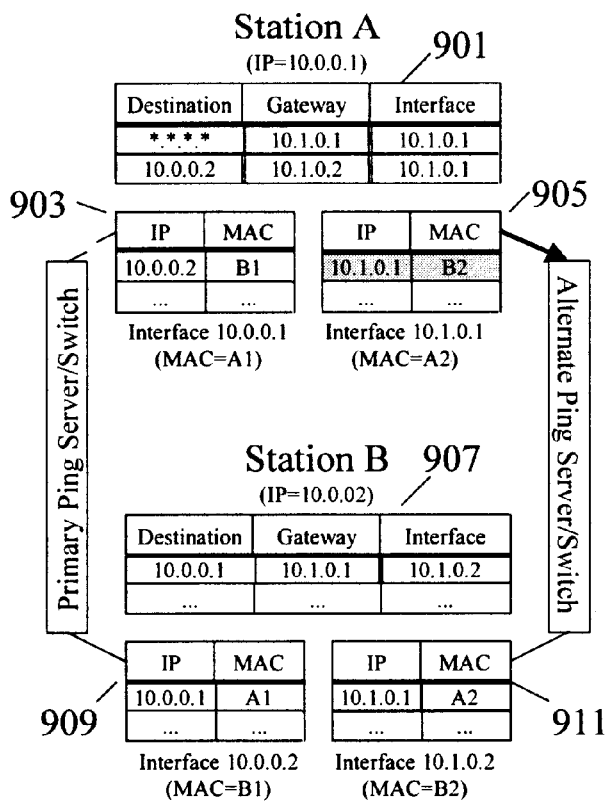

1) Station A receives the NGP.
2) It reroutes traffic to Station B only.
3) Because the NGP was not an ACK, it sends a unicast NGP reply.
4) Station A receives the ARP reply.
5) It updates its ARP table.
6) Station A tries to communicate with Station B using interface 10.1.0.1.
7) There is a MAC address listed for Station B's gateway in that interface's ARP table, so communication resumes on the Alternate network.

Figure 10(h) Receiving an NGP ACK

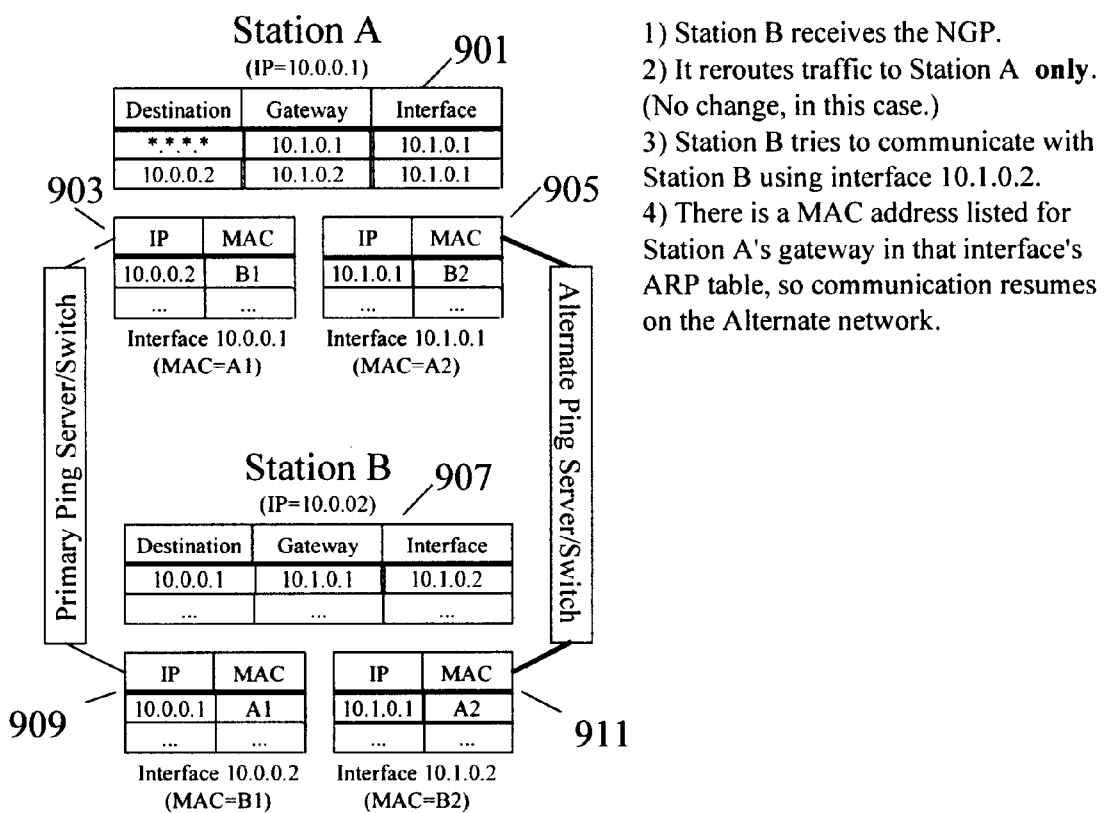
Figure 10(i) Resumption of Normal Communication

NETWORK FAULT DETECTION AND RECOVERY

CROSS-REFERENCE TO RELATED APPLICATION

This application claims the benefit of U.S. Provisional Application Ser. No. 60/122,540 filed Mar. 2, 1999, which is hereby incorporated by reference in its entirety.

TECHNICAL FIELD

This invention relates generally to computer networks, and more particularly, relates to detecting and recovering from faults associated with a computer network used for purposes of process control.

BACKGROUND OF THE INVENTION

As computing devices become faster and more reliable, they are increasingly being employed to control critical processes, improving productivity and reducing the risk of human error. However, computing devices are not error-free, and especially with the multitude of interconnections present in a computer network, the risk of loss of process control is ever present. The wires and connections that are located externally to the network stations, devices, and computers have generally proven to be the most vulnerable to breakage, shorting, misconnection, disconnection and so on. There is also a possibility of port-related faults, switch related faults, or other faults which derive from the network itself.

For some processes that utilize a computer network to facilitate process control between computing devices, a loss of connectivity or signal integrity can be costly. Such an error will likely cause the process to run incorrectly, wasting materials and requiring extensive human intervention to restart and stabilize the process. For other more critical processes, such an error could expose process personnel to injury or even death.

In order to continue to reap the substantial benefits conferred by automated process control, while not suffering the detriments resulting from a loss of network integrity, others have sought to provide means for reducing the risk of network failure between any two nodes on a control network. Such means include, generally, improved network configurations, protocols, and integrity verification mechanisms.

One particular solution to this problem has been the use of fault tolerant connections to the network of interest. Thus, for example, a single computer or workstation may be connected to a single network via primary and alternate connections. In the case of a fault in the primary connection to the network, such a system would automatically shift routes such that routine communications to and from the affected computer are by the alternate rather than primary route. Traditionally, such systems lack the ability to quickly recover from a fault at the necessary time, in order to prevent process disruption. This is caused in part by the possibility with some such systems that the alternate connection may fail without notification to the connected computer. Thus, at the time that the primary connection fails and an attempt is made to route communications through the alternate connection, the latent failure associated with the alternate connection is belatedly detected, preventing timely recovery. An even greater disadvantage of systems which use only redundant connectivity to provide fault recovery is that they do not allow recovery from a network fault that occurs on the network itself rather than on the connections between the computer and the network.

Systems that use simultaneous, rather than alternate, communications over redundant network connections, or that otherwise periodically verify the integrity of the alternate link, may more quickly discover, and hence recover from, any fault in one of the connections. However, such systems still suffer the latter deficiency, namely the inability to recover from network faults within the network itself.

Occasionally, existing dual network fault recovery schemes are employed to overcome some of the aforementioned deficiencies. However, these specialized topologies which utilize connection to two separate networks to effect fault recovery are still deficient as currently implemented in that they often do not provide timely notice of network or connection faults, sometimes making recovery impossible or time consuming. In addition, such existing systems require specialized proprietary network connection equipment, rather than off-the-shelf components. This may increase the system cost and complexity. Further, this may inhibit the ability of a single computer to access another ordinary network such as a corporate LAN in addition to the redundant networks using standard network interface hardware, such as a standard Ethernet card, Token Ring card, or other network card using a standard networking protocol. A redundant network fault recovery system is needed which provides timely network fault detection and recovery, while using non-proprietary hardware to connect computers to the network and allowing access to the redundant networks as well as other networks via standard network interfaces.

SUMMARY OF THE INVENTION

In accordance with these needs, there is provided in the present invention a redundant network architecture wherein faults related to a network and associated ports are dynamically detected via a heartbeat pinging mechanism and other mechanisms. Furthermore, when a fault is detected by whatever mechanism, network traffic is automatically rerouted by manipulation of local and remote routing tables or port look-up tables to effect rapid fault recovery.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its features and advantages, may be best understood from the following detailed description taken in conjunction with the accompanying drawings of which:

FIGS. 10(a)–(i) are illustrations of IP and ARP table contents for, and packets exchanged between, two networking machines before during and after fault detection by one machine in an embodiment of the invention.

DETAILED DESCRIPTION OF THE INVENTION

Turning to the drawings, the invention is illustrated as being implemented in a suitable computing environment. The invention will be described in the general context of computer-executable instructions, such as program modules, being executed by a computing device. Generally, program modules include routines, programs, objects, components, data structures, etc. that perform particular tasks or implement particular abstract data types. In a distributed computing environment, program modules may be located in both local and remote memory storage devices.

Figure 1:
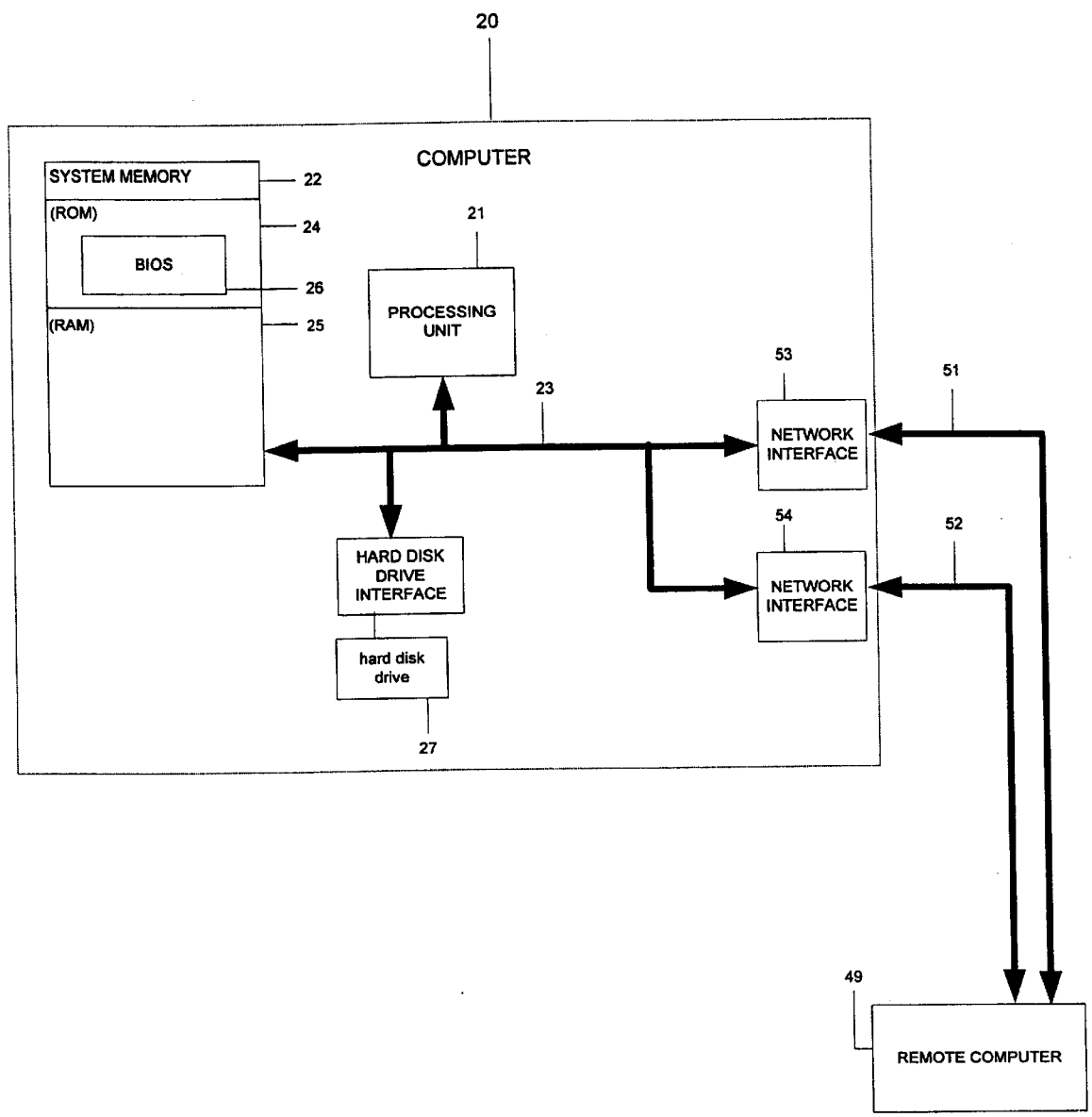
FIG. 1 is a block diagram generally illustrating an exemplary computer system on which the present invention may reside.

With reference to FIG. 1, part of an exemplary system for implementing the invention includes a computing device such as computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 may further include a hard disk drive 27 for reading from and writing to a hard disk, not shown.

A computing device used in an embodiment of the present invention will operate in a networked environment using logical connections to one or more remote machines, such as remote computer 49. The logical connections depicted in FIG. 1 include local area networks (LANs) 51, 52. Such networking environments are commonplace in offices, enterprise-wide computer networks, intranets, factories and so on. The computer 20 is connected to the local networks 51, 52 through network interfaces or adapters 53, 54 such as Ethernet or Token Ring cards. The network interfaces 53, 54 may be additional hardware or may be integral to the motherboard of the computer. A given network and/or its connections to one or more machines may be wireless rather than via physical hardwired connections.

In the description that follows, the invention will be described with reference to acts and symbolic representations of operations that are performed by one or more computing devices, unless indicated otherwise. As such, it will be understood that such acts and operations include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data.

While the invention is described by reference to computers, stations, or machines, these terms are not limited to a computer as described with reference to FIG. 1. Rather, any computing device having a processor and the ability to maintain a routing table and to execute software according to the method of the invention may be used in conjunction with the invention. It is not necessary that a computing device have a user interface to be usable within the invention. Thus, certain computers, workstations, field devices such as transmitters, and other potential network nodes meeting the above criteria may be used to implement the invention. For example, in a process control environment, devices residing on the redundant networks, intercommunicating, and performing network fault detection and recovery according to the invention may include process control workstations, field devices associated with the controlled process, and so on. The term computer therefore as used herein contemplates any such computing device.

As will be described in greater detail hereinafter, in a preferred embodiment of the invention, a network topology and operation are provided, wherein computers are connected to two separate networks. The operation of the computers is such that special hardware is not needed to provide connectivity or fault detection. Additionally, the standard IP stack may be used and manipulated in the course of providing fault recovery, as will be described. In general, a fault on a computer's primary network is dynamically detected by the computer and communications to that computer thereafter automatically take place via another alternate network.

Faults may be herein classified as network faults and port faults. A network fault is a suspected loss or corruption of connection somewhere between a station and a particular local ping server. A port fault is a loss of integrity on a port or some other error local to an Ethernet, or other standard type, controller. A network affected by either of these types of faults is said to experience a communication fault.

Figure 2:
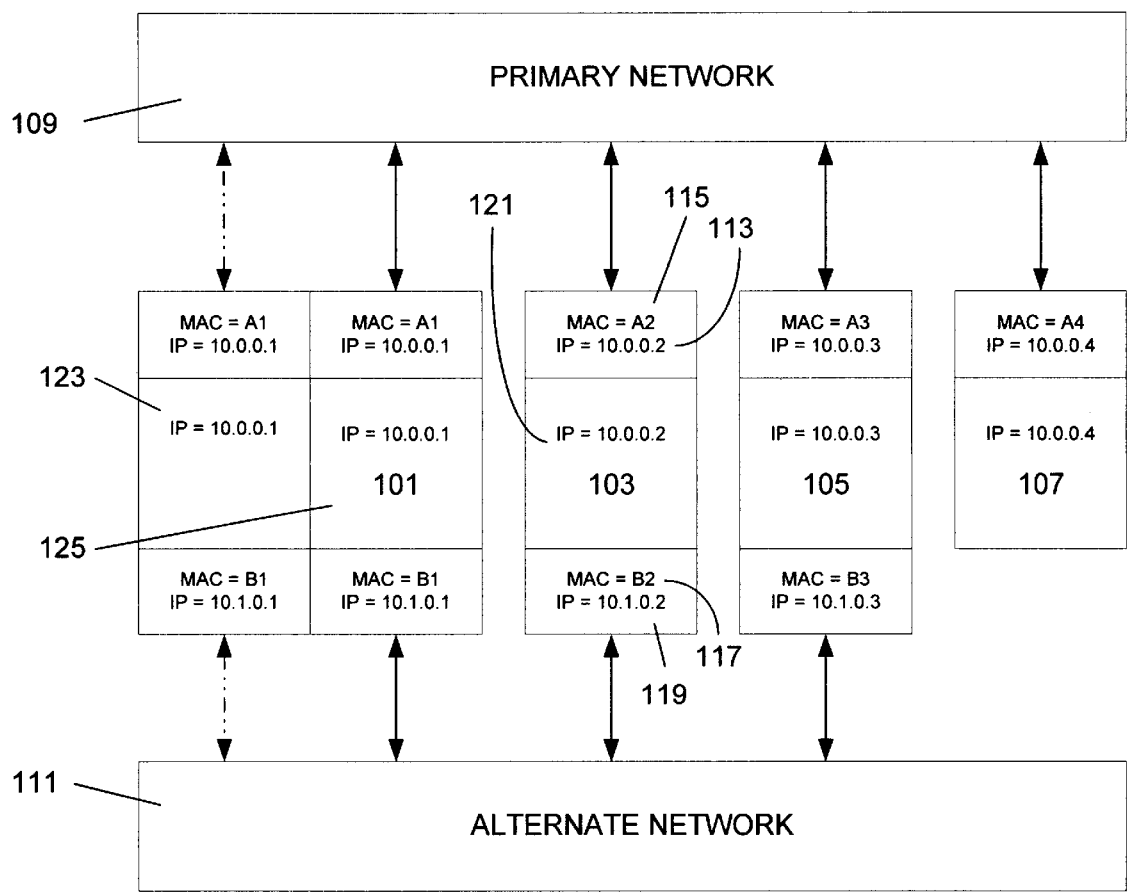
FIG. 2 is a block diagram of a redundant network topology for implementing an embodiment of the invention.

The network topology schematically illustrated in FIG. 2 exhibits an exemplary dual network system including the network configuration utilized in accordance with a preferred embodiment of the invention. Computers 101, 103, 105 are connected to primary 109 and alternate 111 networks, and will be referred to herein as redundantly connected computers. Computer 107 is connected only to the primary network 109 and shall be referred to herein as a singly connected computer. The primary 109 and alternate 111 networks are duplicate independent networks. As illustrated, it is possible that certain fault-tolerant computers, such as computer 101, may have two connections to each network. Network switches in the preferred network configuration implement the Spanning Tree Protocol (STP), which dynamically determines the best path from a source to a destination. This protocol avoids loops and consequent errors, largely eliminating one source of network error.

Message transfer within either network is preferably managed by way of a transport protocol such as TCP/IP, while the physical transmission of data is controlled by a particular media access method. For example, LANs typically utilize some form of collision detection or a token passing method for transmitting data between nodes. The IEEE 802 specification divides the data link layer into a Logical Link Control (LLC) layer and a Media Access Control (MAC) layer. The LLC layer provides an interface point to the MAC layer, which specifies the particular access method used (e.g. the Ethernet protocol) as is well known to those of skill in the art. While the invention is described with reference to the Ethernet protocol, one of skill in the art will appreciate that other network protocols may equivalently be used.

In a preferred embodiment, a computer's connection to a primary network 109 is assigned an IP (Internet Protocol) address 113 and a MAC address 115, while its connection on an alternate network 111 is assigned a different MAC 117 and IP 119 address. In addition, each computer may also be assigned a logical IP address 121 corresponding to one of the connection IP addresses. A redundantly connected computer may communicate over either network or over both networks simultaneously. The status of a network as preferred or alternate is with respect to individual machines; thus, different machines may choose different networks as their preferred, or default, network, as will be discussed hereinafter. Unicast packets are sent on a single network while broadcast packets are sent over both networks. Multicast packets may be sent over either or both networks, depending upon the destinations.

A singly connected computer communicates on only one network. Accordingly, all singly connected computers that need to intercommunicate should be connected to the same network. These computers may treat the network 109 as an ordinary network. If the network 109 to which any singly connected computer is connected experiences a communication fault, that computer may lose communication to all or part of the attached network with no option of recovery until the fault is corrected.

Figure 3:
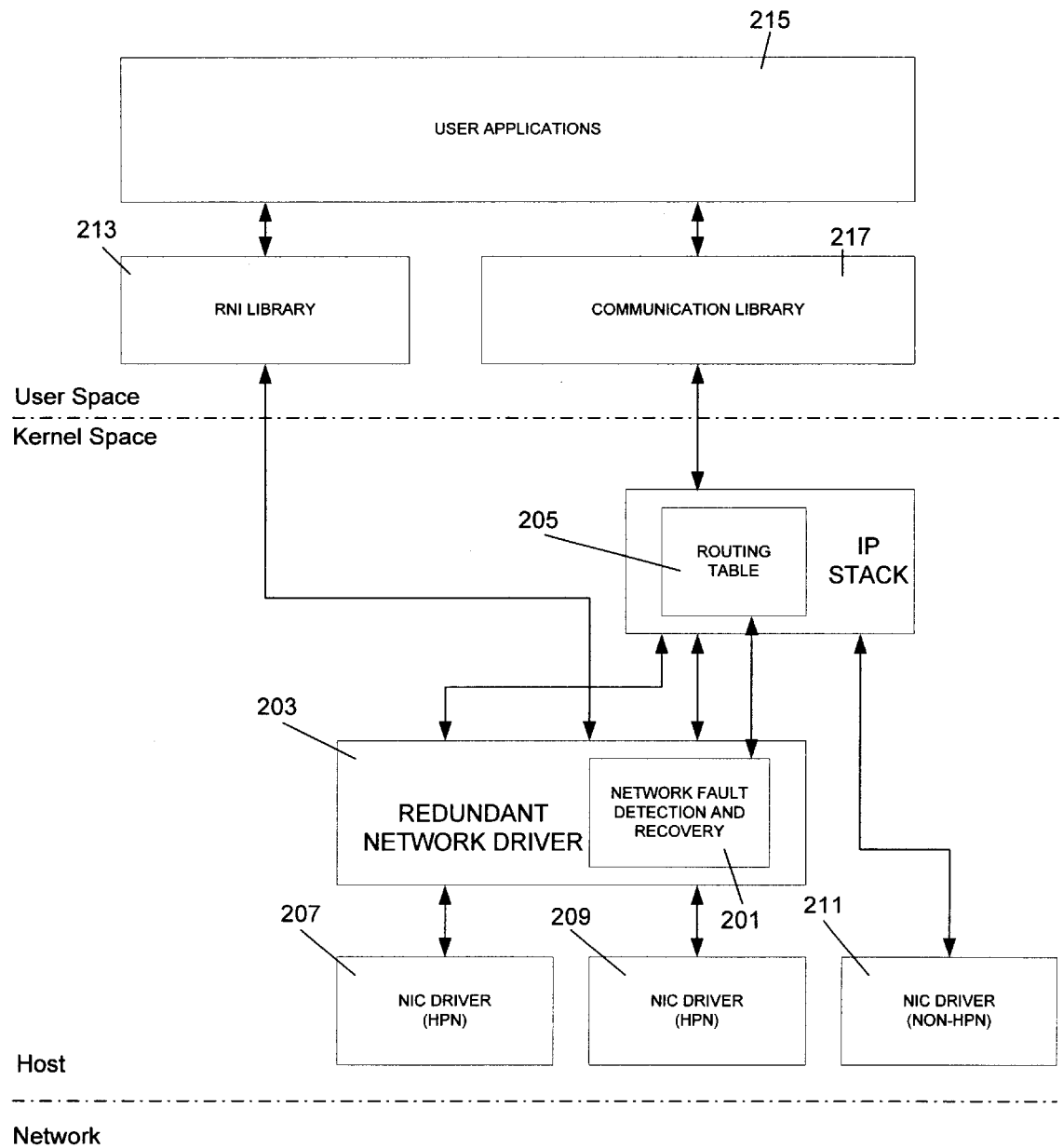
FIG. 3 is a diagram of the logical configuration of a computer operating according to an embodiment of the invention.

FIG. 3 schematically illustrates in greater detail the logical organization and relationship of functional components in an embodiment of the invention with respect to a particular computer. The Network Fault Detection and Recovery (NFDR) algorithm 201 operates within a redundant network driver (RND) 203, which itself resides above the data link layer and below the network layer (e.g., IP). In particular, the NFDR 201 presents an application programming interface (API) to the RND 203. Applications 215 running in user space interact with .the lower layers through a communication library 217 and a redundant network interface library 213.

Singly connected computers utilize an off-the-shelf network interface card (NIC), or equivalently a standard built in interface, while redundantly connected computers utilize two off-the-shelf NICs, or equivalently two standard built in interfaces, one for each network. Illustrated NIC drivers 207, 209 are associated with the NICs in a redundantly connected computer. The RND 203 appears to the computer operating system as a pair of drivers, such as a pair of standard Ethernet drivers. By manipulating a network routing table 205 in conjunction with performing other tasks, the NFDR 201 transparently adds redundancy functionality to route network traffic around known or detected faults.

Additionally, by adding redundancy behavior in a manner that utilizes the appropriate standard network interfaces or interface cards, the invention allows a machine to access other networks in addition to the redundant network system through the use of additional standard NICs. For example, the NIC driver 211 of FIG. 3 may utilize the local IP layer also to access another network without interference from the redundant network driver 203. This allows the host machine to be used to additionally, and even simultaneously, communicate on both the redundant network and another network such as a corporate LAN.

The routing table 205 is a table used by the IP stack, which determines how to send outbound IP packets. Table I depicts the contents of an example routing table.

TABLE I

| Destination | Gateway | Interface | Note |
| --- | --- | --- | --- |
| 10.0.0.1 | 127.0.0.1 | 127.0.0.1 | Primary Port |
| 10.1.0.1 | 127.0.0.1 | 127.0.0.1 | Alternate Port |
| 10.0.0.2 | 10.1.0.2 | 10.1.0.1 | Host |
| 255.255.255.255 | 10.0.0.1 | 10.0.0.1 | Broadcast Address |
| *.*.*.* | 10.0.0.1 | 10.0.0.1 | Default Route |
| 10.1.*.* | 10.1.0.1 | 10.1.0.1 | Alternate Network |
| 10.1.*.* | 10.0.0.1 | 10.0.0.1 | Primary Network |

The routing table 205 includes a list of network and host IP addresses, the gateway addresses used to reach them, and the interface IP addresses over which messages should be sent. In the example of Table I, the routing table has entries for the station's two ports, the ports' networks, another station address, the broadcast address, and a default route. The address 127.0.0.1 is a special address indicating a loopback, or local, address. When the IP stack prepares to send a packet to a specific destination IP address, it finds a corresponding destination entry in the routing table 205. If an exact match is found, it is used. Otherwise, an address is found that uses the network upon which the destination is located. If there is no matching host or network entry, the default address is used.

In the example of Table I, traffic destined for host 10.0.0.2 is sent over an interface whose IP address is 10.1.0.1 (alternate port), and is sent to the gateway 10.1.0.2. The gateway acts as an intermediary, forwarding the packet to its final destination. Traffic to host 20.0.0.1 would not match any host or network address, and so is sent using the default route over the primary port (10.0.0.1). Generally, the routing table 205 is hidden by the host operating system. Accordingly, the table is preferably accessed via platform-specific API's provided by the operating system.

Although the manipulation of the IP stack is the preferred method for rerouting network traffic, and the invention will be described predominantly herein below in that context, it is also possible within an embodiment of the invention to alternatively use a port look-up table for this purpose, as described in U.S. Provisional Application Ser. No. 60/122, 540 filed Mar. 2, 1999, which is hereby incorporated by reference in its entirety. The look-up table is used in the same way to store, alter, and retrieve addressing information. Table entries may be keyed using MAC addresses, and similarly list information usable to contact a given machine on its appropriate network. Table 2 exemplifies a look-up table usable in an embodiment of the invention.

TABLE 2

| MAC Address | Port |
| --- | --- |
| 01 23 45 67 89 | 2 |
| 01 23 45 67 AB | 1 |
| 01 23 45 67 CD | 2 |
| 01 23 45 67 EF | 2 |
| 01 23 45 67 00 | 1 |
| 01 23 45 67 01 | 2 |
| 01 23 45 67 02 | 2 |
| . . . | . . . |
| 01 23 45 67 99 | 2 |

In operation, when an incoming packet is received, the RND 203 utilizes the NFDR 201 via the NFDR API to determine whether to discard the packet or to pass it on to higher protocol layers, as will be more fully described hereinafter. The functionality of the RND 203 may also be accessed more directly by a user application utilizing the redundant network interface library 213 for diagnostic and configuration purposes. Preferably in such cases, the redundant network interface 213 passes a call to the RND 203, which makes an appropriate call to the NFDR API.

As illustrated in FIG. 3, and with reference to the steps of FIG. 6, the operation of a redundant network in an embodiment of the invention is as follows. Each station picks or is assigned a network as its preferred network in step 501 and predominantly communicates over this network while it remains unfaulted such that, overall, network congestion on each network is minimized. Prompted by the NFDR algorithm 201, the RND 203 checks for network faults or recoveries by sending out periodic pings to a local ping server located on the network being analyzed as in step 503 and checking the link integrity of the ports as in step 505. If there is a change in the state of the analyzed network, the NFDR algorithm 201 has the capability to change the routing table 205, and if the preferred port is to be changed, the NFDR 201 causes the station to broadcast a New Gateway Packet (NGP) to the other stations to inform them of the new port as in step 509. In response, on computers that receive the NGP and that are capable of communicating to the new default port, the routing table 205 is updated via the NFDR algorithm 201 on those computers to reflect the new communication route.

Figure 4:
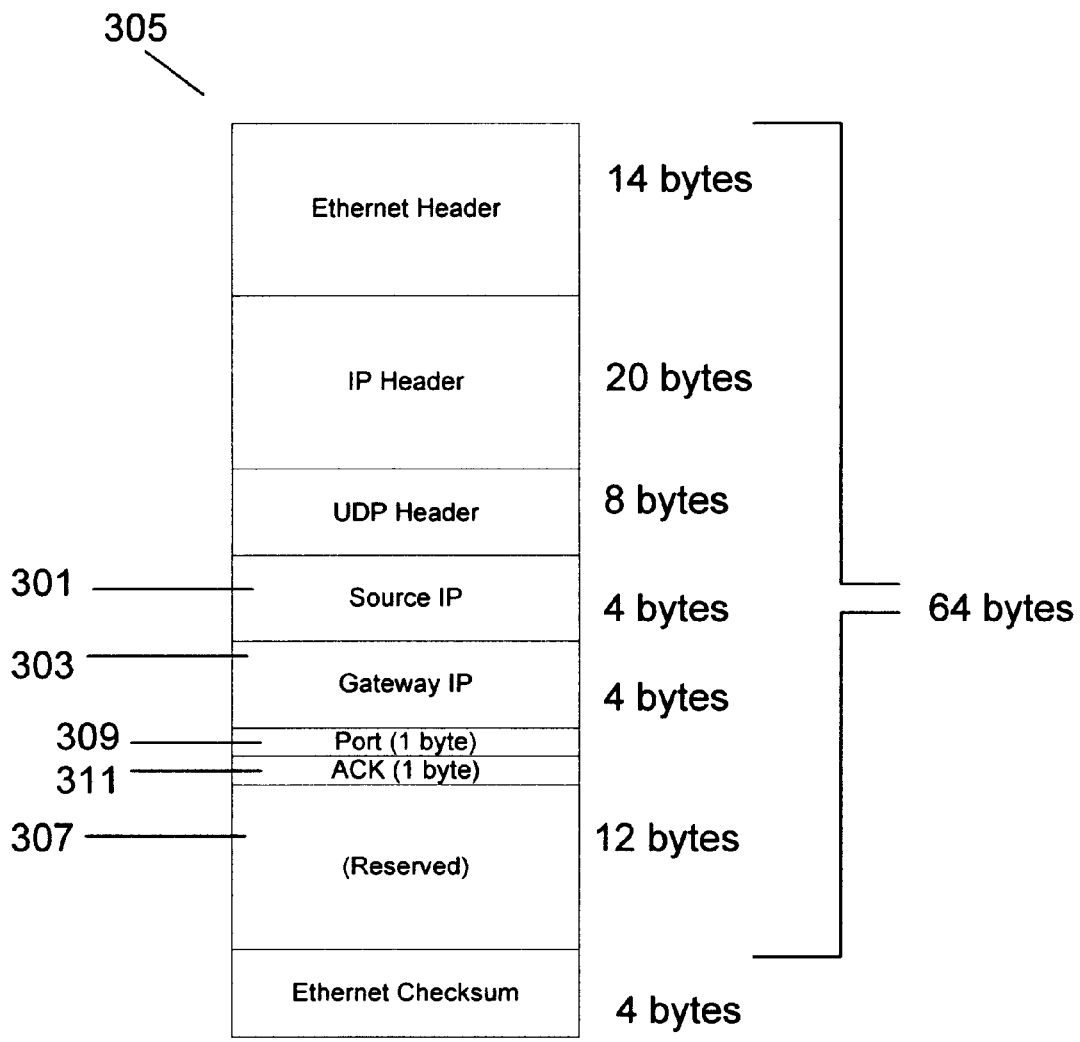
FIG. 4 is a diagram illustrating an exemplary New Gateway Packet structure in an embodiment of the invention.

The structure of a NGP is illustrated in FIG. 4. In an embodiment of the invention, the NGP is an Ethernet packet 305, with fields for the station's logical IP address 301, and the IP address of the preferred port 303. The preferred port is treated as the gateway address that should be used to reach the station. The NGP also contains a port field 309 for specifying the preferred port (for example, 0 for primary, 1 for alternate) and an ACK field 311. The structure of the NGP is not critical, and one of skill in the art will realize that the NGP may have various structures and content.

In overview, this multicast NGP is used by receiving stations to update their routing tables to reflect the new route to the originating station. However, in order to ensure that the originating station has a proper route to the receiving station it is preferable that a receiving station currently communicating with the originating station send a unicast acknowledgment NGP to the originating station with the ACK field set to zero. This packet causes the originating station to update its routing table entries for the receiving station, while the ACK field value of zero notifies the originating station that it does not need to send any further acknowledgment NGP.

The receiving station uses an ARP (Address Resolution Protocol) table to determine whether it is in communication over a given port with the originating station. Receiving stations which are not communicating with the originating station preferably do not reply to NGP's, in order to minimize network traffic.

Figure 8:
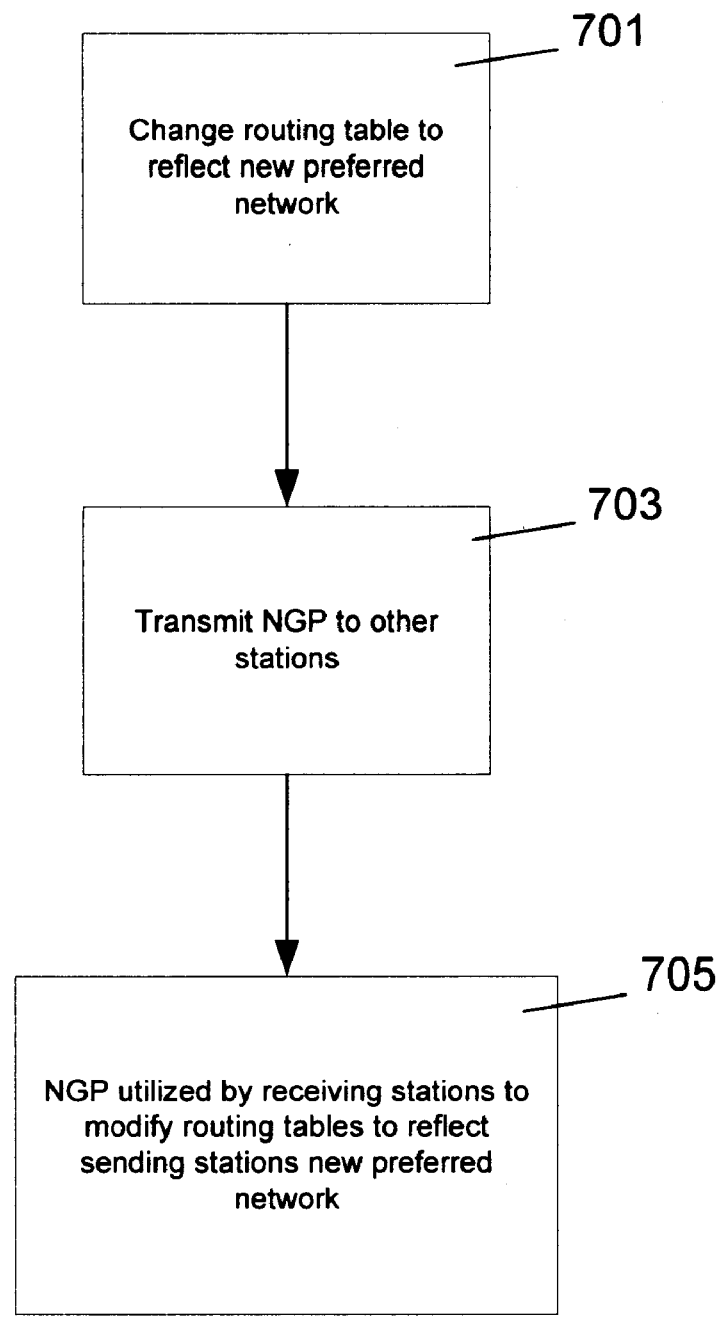
FIG. 8 is a flow chart generally illustrating the steps taken within an embodiment of the invention to effect communication fault recovery.

In greater detail, with reference to FIG. 3, if a port or network is marked as faulted, and the other network and port have not been determined to be faulted, the NFDR 201 updates the routing table 205 to use the other port as the default port as discussed. In particular, with reference to step 701 of FIG. 8, the NFDR 201 removes from the routing table 205 any entry whose interface matches the faulted port's IP address, and sets the default route to use the new port's IP address. Additionally, in step 703, the NFDR 201 causes a NGP indicating the new default port to be broadcast as discussed above. Other stations receiving this packet update their routing tables as well via their NFDR 201 in step 705, if they are in communication with the affected station, to indicate the new default port as the gateway address to the affected station. In particular, the NFDR 201 of such a station adds or updates an entry in the routing table 205 for the NGP originating station, the gateway address of which is taken from the NGP, and the interface of which is set to correspond to the IP address of the port over which the NGP was received.

A fuller explanation of the interaction and relationship between ARP and the operations of an embodiment of the invention are hereinafter described with reference to FIG. 10. ARP is a TCP/IP protocol used to map an IP address to the corresponding MAC address as is well known to those of skill in the art. ARP operates with respect to network nodes rather than station addresses, so each interface of a station has a MAC address and an ARP table associated with it. The stages of FIG. 10 illustrate an exemplary course of communications between two stations during fault recovery according to an embodiment of the invention.

When a station initiates communication to an IP address, it sends a broadcast ARP request that is received by that address. RND sends these requests from both ports so that even in the presence of a network fault, at least one will arrive at the appropriate station. Upon receipt, the NFDR of the receiving station responds by sending a unicast NGP to the requesting station over the receiving port. If the ARP request was received on the port that is not the same as the station's logical IP address, this NGP identifies that port as the gateway to the station's logical IP address, initiating another round of ARP traffic to resolve the physical address of that gateway. In the worst case, ARP requests are sent for the IP addresses of both ports, however if there is a path to the other station at least one ARP reply will return with a correct route added on the originating station via a unicast NGP.

In FIG. 10(a), Stations A and B are in normal communication over the primary network. In FIG. 10(b), Station A detects a fault, for example a port fault, reroutes all traffic in its IP table 901 to the non-faulted interface, and sends a multicast NGP 913 indicating the non-faulted interface. In FIG. 10(c), Station B receives the NGP 913 and reroutes traffic to station A in its IP table 907, so that such traffic will use Station A's non-faulted interface. Now however, in FIG. 10(d), Station A is unable to communicate with Station B using the non-faulted interface if the ARP table 905 associated with that interface has no entry for station B. Accordingly, Station A sends an ARP request 915 for Station B from the non-faulted interface. In FIG. 10(e), upon receiving the ARP request 915, Station B updates its ARP table 911 on the appropriate interface, however, it does not send an ARP response because the ARP request was not received by the proper interface (Station A's IP table 901 still lists the Station B interface on the other network as the gateway to Station B). Instead, Station B sends a unicast NGP 917 to Station A.

Upon receipt of this NGP 917 in FIG. 10(f), Station A reroutes all Station B traffic in its IP table 901 and, because the ACK field of the received NGP was "NO," sends a unicast NGP reply 919 to Station B. In attempting to communicate with Station B through the appropriate Station A interface, Station A realizes that there is no entry for Station B's gateway in that interface's ARP table 905. Accordingly, Station A sends an ARP request 921 for that gateway.

In FIG. 10(g), Station B receives the NGP 919 and reroutes Station A traffic (which requires no change now) in its IP table 907. Station B also receives the ARP request 921, updates its ARP table 911 (also no change) and sends a unicast NGP 923 and an ARP reply 925 to Station A.

In FIG. 10(h), upon receiving the NGP 923, Station A reroutes Station B traffic in its IP table 901 (no change) and sends a unicast NGP reply 927 because the received NGP 923 had an ACK of "NO." Station A also updates the appropriate ARP table 905 in response to the ARP reply 925, and Station A can now communicate normally to Station B over the alternate network. In FIG. 10(i), Station B receives the NGP 927 and reroutes Station A traffic in its IP table 907 (no change) and can communicate normally to Station A over the alternate network.

Referring to FIG. 3, with respect to incoming data packets, the RND 203 passes these packets to the NFDR algorithm 201 for validation. Packets may either be discarded or passed on to higher protocol layers. For example, duplicate multicast packets and packets received over a disabled port are discarded. Additionally, ping replies and NGP's are discarded in the sense that they are not passed on to higher layers. Instead these packets are saved and utilized internally by the NFDR 201 as indicated above.

The receipt and particular treatment of duplicate packets in an embodiment of the invention are described in greater detail as follows. Due to the fact that multicast and broadcast packets may be sent over both networks, it is frequently the case that a particular station will receive duplicate packets from the two networks. For example, when the RND 203 receives a packet from the higher protocol layers whose destination MAC address is an Ethernet multicast address, it may send a copy of the packet over both ports on a redundantly connected computer. In turn, when NFDR 201 receives an Ethernet multicast packet, it tells the RND 203 to pass it up to the higher layers, while recording and saving the packet's IP checksum as a unique identifier. If a later packet having the same IP checksum is received, it is assumed to be the duplicate copy of the earlier packet. Accordingly, NFDR 201 causes the RND 203 to discard the packet, and discards the saved checksum. After a short predetermined amount of time, it is preferable that saved unmatched checksums be discarded, on the assumption that any duplicate packet would have arrived within the predetermined time. IP checksums rather than Ethernet checksums, are preferably utilized in the above course of action. This is because the Ethernet checksums of packets from ports having different MAC addresses will almost invariably have different Ethernet checksums for the same packet content.

Figure 6:
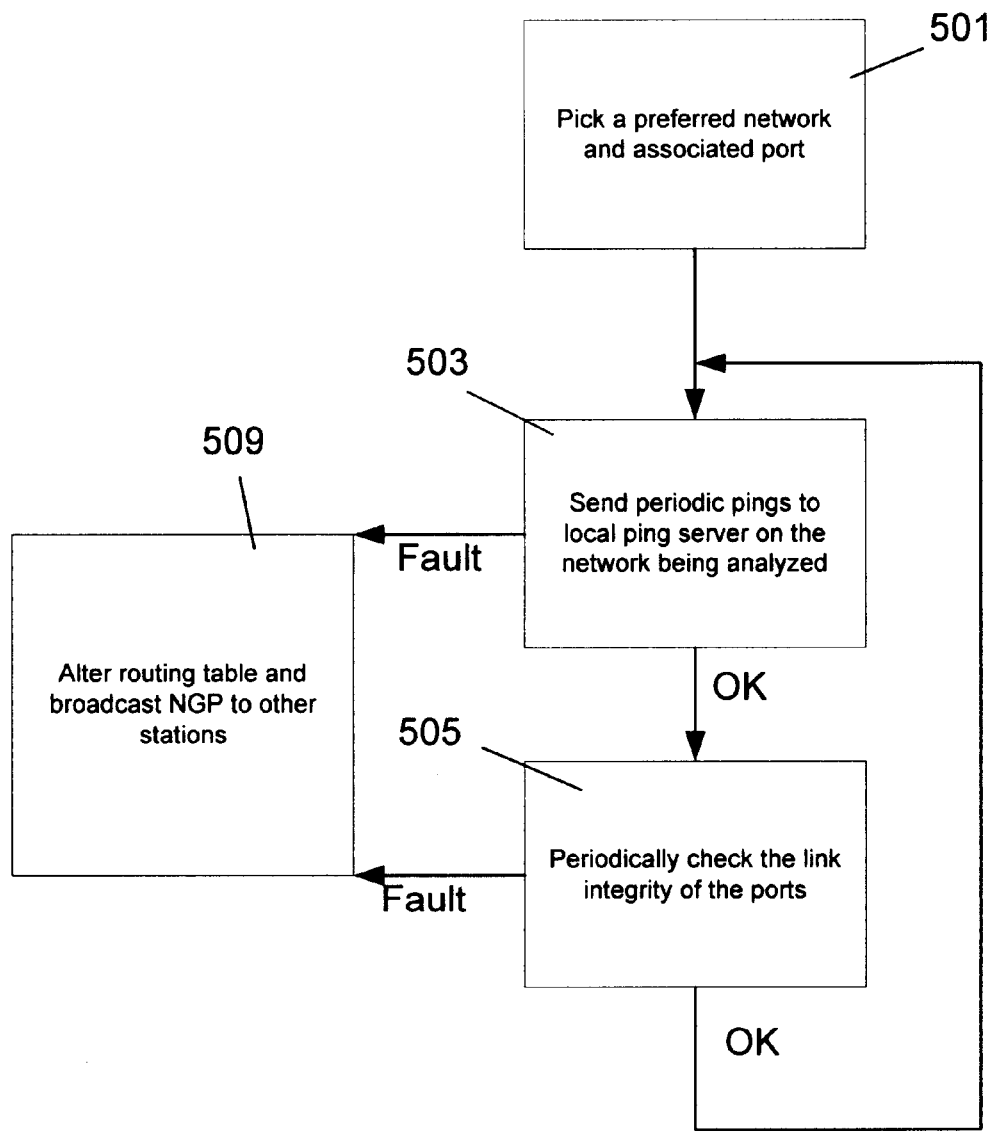
FIG. 6 is a flow chart generally illustrating the steps taken within an embodiment of the invention to check for a communication fault in an analyzed network.
Figure 7:
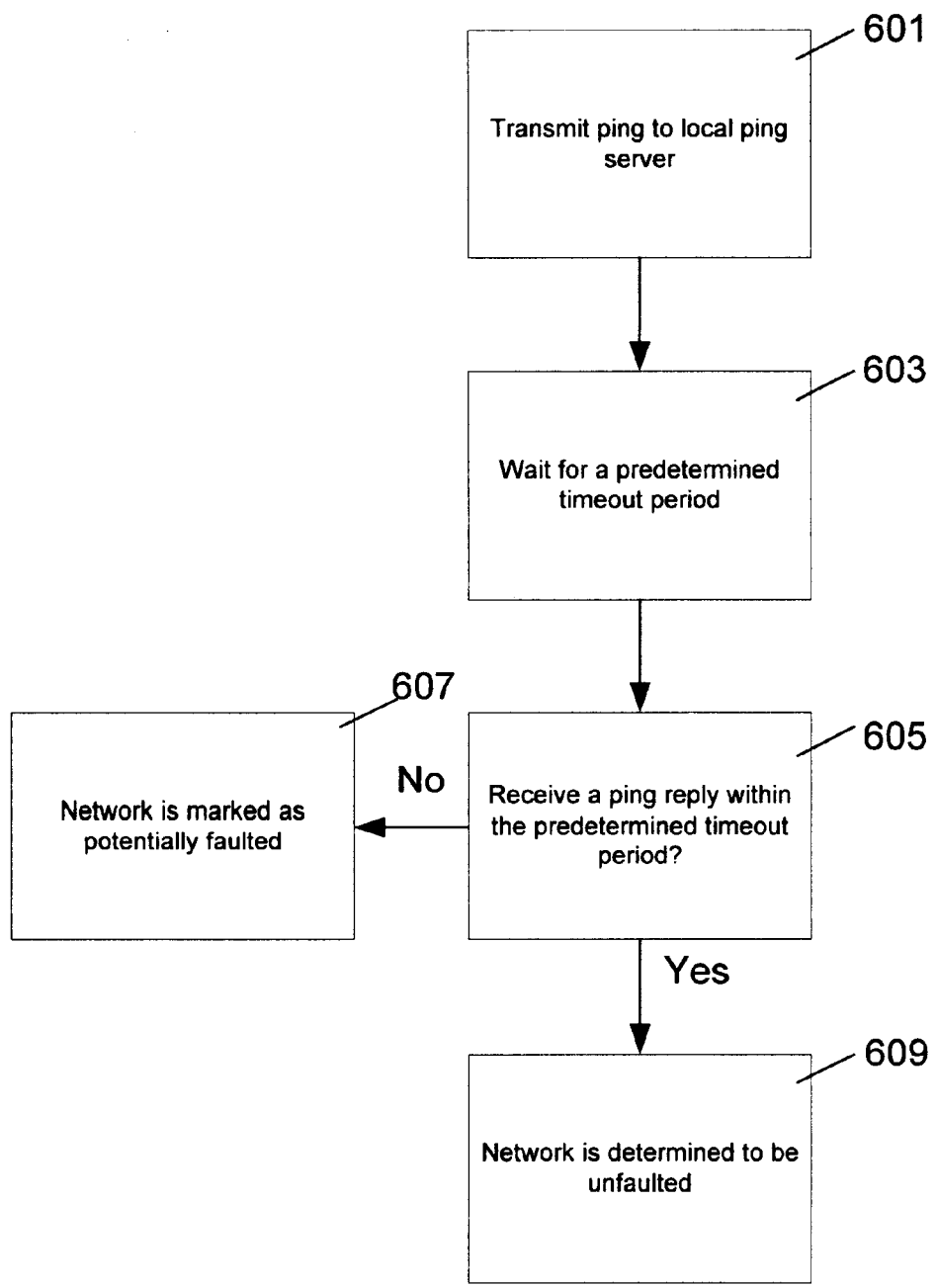
FIG. 7 is a flow chart generally illustrating the steps taken within an embodiment of the invention to check for a communication fault in an analyzed network by pinging a ping server on the network.

As mentioned previously in overview with respect to step 503 of FIG. 6, the NFDR 201 uses a periodic connectivity verification method as one way to detect the existence of network faults. In particular, with reference to FIG. 3 and the steps of FIG. 7, the NFDR 201 periodically causes pings to be sent to local ping servers in step 601, sending a ping to the local primary ping server via the primary port, and a ping to the local alternate ping server via the alternate port. If the station does not receive a ping reply within a predetermined timeout period (step 603), it is assumed in step 605 that connectivity between the station and the particular ping server is defective. Accordingly the affected network is marked by the NFDR 201 as potentially faulted in step 607. The redundant network interface 213 is then notified of the suspected fault. If a ping reply is received within the predetermined timeout period, the network is determined to be unfaulted in step 609.

Figure 5:
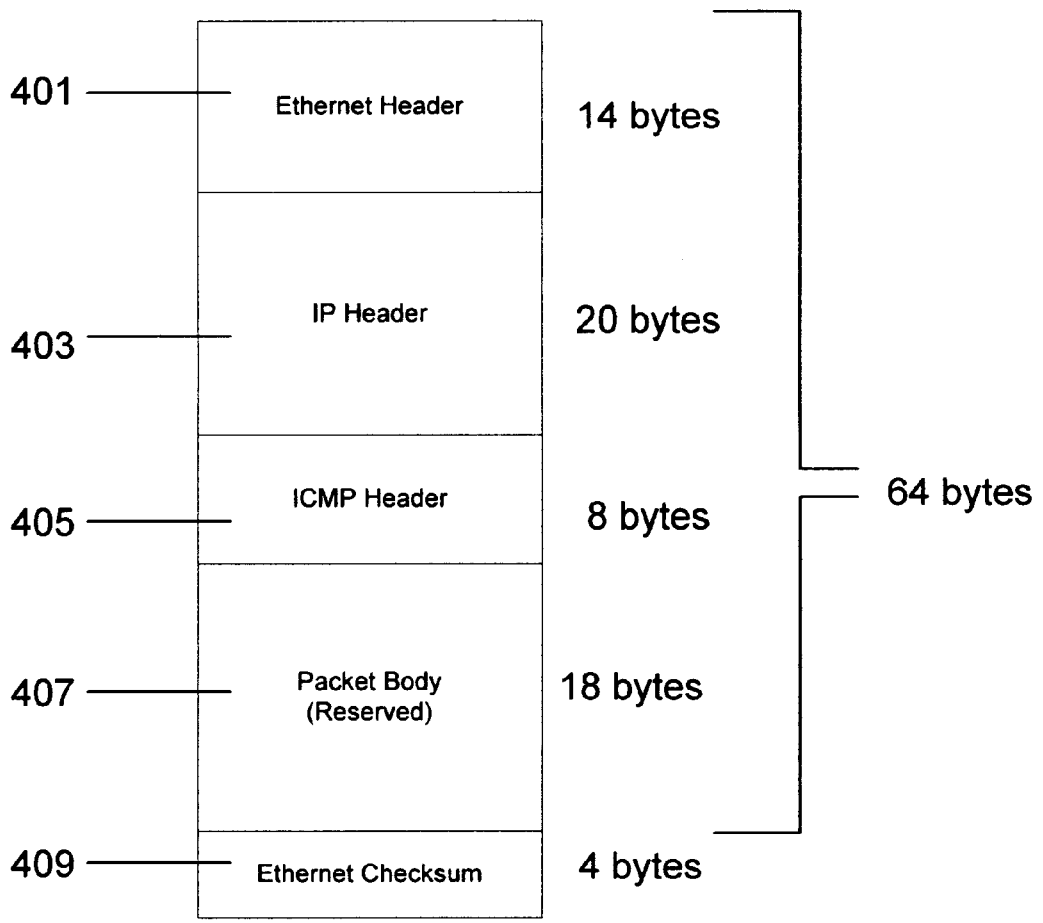
FIG. 5 is a diagram illustrating an exemplary ping packet structure usable in an embodiment of the invention.

In an embodiment of the invention, the ping structure preferably corresponds to a standard ICMP echo request message. The structure of such a message packet is illustrated in FIG. 5. The packet typically comprises an Ethernet Header 401, IP Header 403, ICMP Header 405, Packet Body 407, and Checksum 409.

Preferably, the heartbeat pings are transmitted approximately every 500 ms to both networks when neither is marked as potentially faulted. In an embodiment of the invention, the ping frequency for the primary or preferred network may be higher than the ping frequency for the alternate network, but this need not be the case. The timeout period is preferably less than the amount of time between pings, such as for example 200 ms. These temporal values may be user-configurable depending upon the particular environment in which the invention is used. With respect to a network previously determined to be faulted by failure to receive a ping reply as discussed above, the ping rate may drop to a standby rate such as one ping per 30-second interval, returning to the prior rate once recovery of the network and integrity of the associated port have been detected. Thus using the values given above as an example, a redundant network system embodying the invention may recover from a detected fault within 700 ms, plus overhead time for transmission of the NGP and processing time for updating routing tables in a worst case scenario. In any case, depending upon the particular temporal values utilized, the total recovery time for such a system may be substantially less than a second.

Although the connectivity verification mechanism described utilizes ICMP ping requests and replies, the invention is not limited to this method of connectivity verification. Those skilled in the art will appreciate that another method of verifying connectivity may be utilized to implement the invention, if such method is used for the purpose of confirming network connectivity between a particular computing device and another point on the network under analysis. Accordingly, the terms "connectivity verification packet" and "connectivity verification reply" encompass any transmissions and receipts, respectively, utilized in fulfillment of the aforementioned purpose. Likewise, a "connectivity verification server" is any device usable to receive a connectivity verification packet from a source and to return a connectivity verification reply to the source in response. Alternatively, although in the described connectivity verification sequence a computing device periodically contacts a local server, those skilled in the art will appreciate that the connectivity verification may alternatively be server-initiated. Thus, the computing device may instead await periodic connectivity verification packets from the server.

With respect to port integrity, RND 203 periodically checks for port faults on each port in one of several ways familiar to those of skill in the art, as in step 505 of FIG. 6. If the RND 203 detects a loss of integrity on a particular port, the NFDR 201 will mark the port, and hence the associated network, as faulted and will notify the redundant network interface 213.

Figure 9:
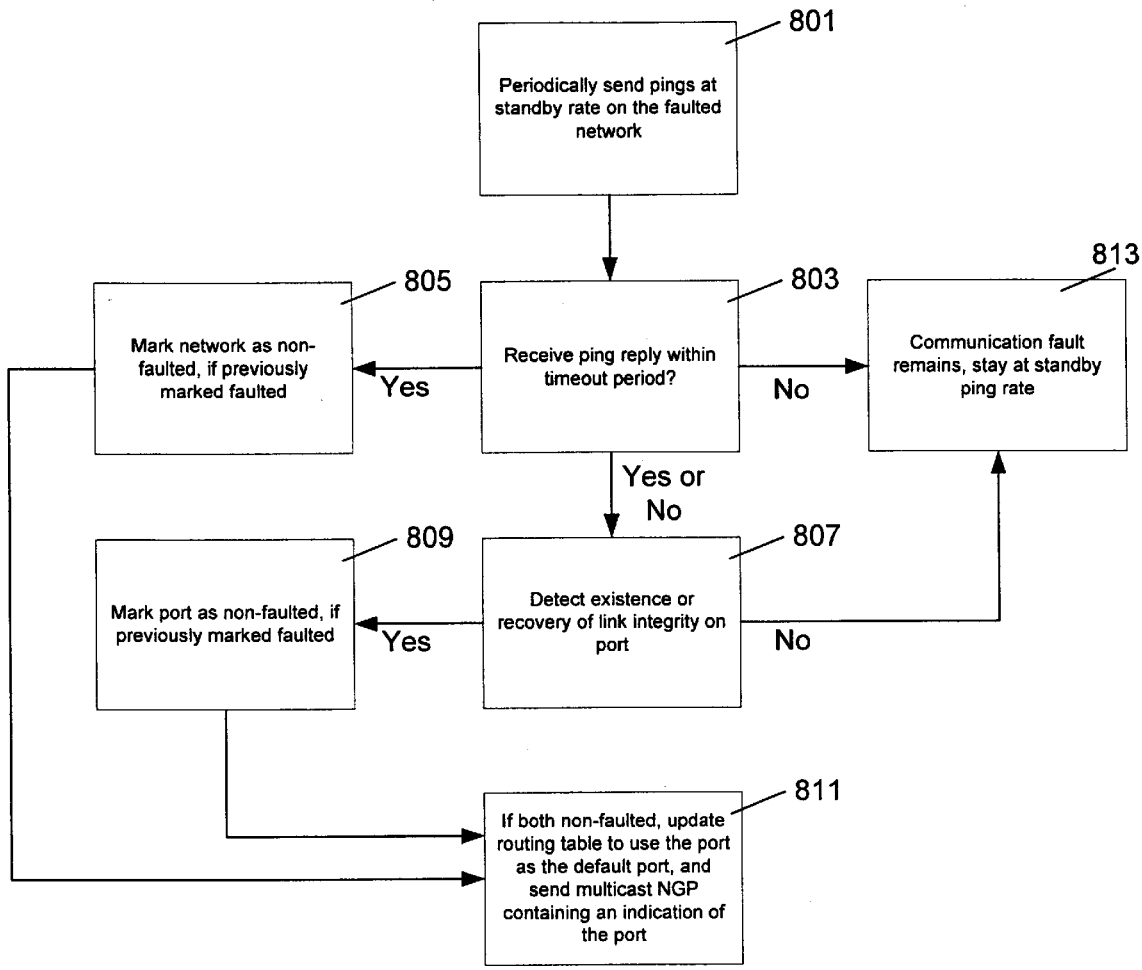
FIG. 9 is a flow chart generally illustrating the steps taken within an embodiment of the invention to detect recovery of a network from a previously detected communication fault.

Fault detection and recovery run substantially concurrently. When a station still has unrecovered faults, it periodically sends pings at a standby rate, which may be a lower rate as discussed above, to the faulted areas to check for recovery, as in step 801 of FIG. 9. If a ping reply returns in step 803 from a previously unreachable ping server within a timeout period, NFDR 201 marks the associated network as non-faulted in step 805, and signals the redundant network interface 213 that there was a network recovery. Similarly, if the RND 203 has detected a recovery of link integrity on the relevant port in step 807, NFDR 201 marks the port as non-faulted in step 809 and signals the recovery to the redundant network interface 213. If after a fault recovery both the preferred port and its associated network are no longer faulted, NFDR 201 updates the routing table in step 811 to use the preferred port as the default port, and sends a multicast NGP containing an indication of the new port. If port integrity is established but the relevant network is still faulted, or vice versa, the ping rate remains at the standby rate as in step 813.

With respect to setting a default port, if both ports and/or networks have faults, the default interface is preferably the interface associated with the port and network having fewer, or less serious, faults, with port faults viewed as worse than network faults. For example, the following fault configurations proceed in decreasing order of desirability: a port with no faults; a port with a network fault; a port with a port fault; and, a port with both a port and network fault. A user or administrator may selectively disable a port, and such a port is preferably not chosen as a default port.

The NFDR 201 preferably maintains a database reflecting the network status. For example, the database may list the default and preferred ports, the current fault status of the ports and networks, a historical record of fault detections and recoveries, the number of pings sent, received, and timed out, as well as the number of NGP's transmitted. This database is preferably accessible via the redundant network interface 213 and facilitates network monitoring and administration.

In an embodiment of the invention, singly connected machines (i.e. machines with only a single connection to a single network) such as machine 107 of FIG. 2 are provided with a surplus network driver similar to the RND used on redundantly connected machines. The surplus driver for a singly connected machine does not necessarily need to check for network integrity, but it may. Regardless, it is preferred that the surplus driver receives and interprets, autonomously or via a separate callable algorithm, any NGP's transmitted on the associated network. In this manner, if the surplus driver receives a multicast NGP indicating that another machine is switching to the other network, the singly connected machine may protest. The protest preferably takes the form of a unicast NGP acknowledgement packet from the surplus driver requesting that the switching machine continue to communicate with the singly connected machine on the first network.

Redundantly connected machines having a detected fault on one interface may use the same mechanism to maintain communication on their preferred network when another machine sends out a multicast NGP indicating that it is changing its default network to the other network. A protesting machine preferably does not send an NGP acknowledgement packet unless it is currently communicating with the switching machine, i.e. unless there is an appropriate entry in the protesting machine's ARP table on the preferred network for the switching machine.

In an embodiment of the invention, machines receiving multicast NGP's neither reply nor update their routing table. This occurs if it is determined by the NFDR of the receiving machine by inspecting an ARP table that the machines are not currently intercommunicating.

Although the invention has been described in the context of dual redundant networks, the invention also encompasses any number of multiple independent networks used in the same manner. Thus, in an embodiment of the invention, redundantly connected stations run fault detection on three or more networks, and switch among those three or more networks to effect fault recovery, using the principles set forth above.

In view of the many possible embodiments to which the principles of this invention may be applied, it should be recognized that the embodiments described herein with respect to the drawing figures are meant to be illustrative only and should not be taken as limiting the scope of invention. Accordingly, the invention is not limited to the illustrated embodiments. The invention as described herein contemplates all such embodiments as may come within the scope of the following claims and equivalents thereof.

We claim:

1. A method of fault detection and recovery for use on a computing device that is communicatively connected to first and second networks via first and second standard network interfaces having first and second network ports respectively, and that is using an IP routing table for outgoing packet routing, the method comprising the steps of:

establishing the first network as a preferred network for receiving, via the first network port, incoming communications to the computing device;

transmitting a connectivity verification packet at a first connectivity verification rate to a connectivity verification server residing on the first network;

waiting for a first amount of time after transmitting the connectivity verification packet;

detecting that no reply for the connectivity verification packet is received before the expiration of the first amount of time, and in response registering a fault in the first network;

altering an entry in the IP routing table for outgoing packet routing such that the entry, which indicates the first network port as a default port, is changed to indicate the second network port as a default port and establishing a second connectivity verification rate for transmitting a connectivity verification packet to the connectivity verification server residing on the first network; and causing to be transmitted via the first and second network ports a new gateway packet announcing that incoming communications to the computing device should designate the second network port as a gateway to the computing device.

2. The method according to claim 1, further comprising the steps of:

transmitting a connectivity verification packet at the second connectivity verification rate to the connectivity verification server residing on the first network;

waiting for a second predetermined amount of time after transmitting the connectivity verification packet; and detecting receipt of a reply to the connectivity verification packet before the expiration of the second predetermined amount of time, and in response registering a recovery of the first network and causing to be transmitted via the first and second network ports a new gateway packet announcing that incoming communications to the computing device should designate the first network port as a gateway to the computer.

3. The method according to claim 2, wherein the first connectivity verification rate is greater than the second connectivity verification rate.

4. The method according to claim 2, wherein the first connectivity verification rate is equal to the second connectivity verification rate.

5. A method of fault detection and recovery for use on a computing device that is communicatively connected to first and second networks via first and second standard network interfaces having first and second network ports respectively, and that is using an IP routing table for outgoing packet routing, the method comprising the steps of:

establishing the first network as a preferred network for receiving, via the first network port, incoming communications to the computing device;

transmitting a connectivity verification packet at a first connectivity verification rate to a connectivity verification server residing on the first network;

waiting for a first amount of time after transmitting the connectivity verification packet;

detecting that no reply for the connectivity verification packet is received before the expiration of the first amount of time, and in response registering a fault in the first network;

altering an entry in the IP routing table for outgoing packet routing such that the entry, which indicates the first network port as a default port, is changed to indicate the second network port as a default port;

causing to be transmitted via the first and second network ports a new gateway packet announcing that incoming communications to the computing device should designate the second network port as a gateway to the computing device;

transmitting a connectivity verification packet at a third connectivity verification rate to a connectivity verification server residing on the second network;

waiting for a third amount of time after transmitting the connectivity verification packet; and detecting that no reply for the connectivity verification packet is received before the expiration of the third amount of time, and in response registering a fault in the second network.

6. A method of fault detection and recovery for use on a computing device that is communicatively connected to first and second networks via first and second standard network interfaces having first and second network ports respectively, and that is using a port look-up table for outgoing packet routing, the method comprising the steps of:

establishing the first network as a preferred network for receiving, via the first network port, incoming communications to the computer;

transmitting a connectivity verification packet at a first connectivity verification rate to a connectivity verification server residing on the first network;

waiting for a first amount of time after transmitting the connectivity verification packet;

detecting that no reply for the connectivity verification packet is received before the expiration of the first amount of time, and in response registering a fault in the first network;

altering an entry in the port look-up table for outgoing packet routing such that the entry, which indicates the first network port as a default port, is changed to indicate the second network port as a default port;

causing to be transmitted via the second network port a new gateway packet announcing that incoming communications to the computing device should designate the second network port as a gateway to the computing device; and establishing a second connectivity verification rate for transmitting a connectivity verification packet to the connectivity verification server residing on the first network.

7. The method according to claim 6, further comprising the steps of:

transmitting a connectivity verification packet at the second connectivity verification rate to the connectivity verification server residing on the first network;

waiting for a second predetermined amount of time after transmitting the connectivity verification packet; and detecting receipt of a reply to the connectivity verification packet before the expiration of the second predetermined amount of time, and in response registering a recovery of the first network and causing to be transmitted via the first network port a new gateway packet announcing that incoming communications to the computing device should designate the first network port as a gateway to the computing device.

8. The method according to claim 7, wherein the first connectivity verification rate is greater than the second connectivity verification rate.

9. The method according to claim 7, wherein the first connectivity verification rate is equal to the second connectivity verification rate.

10. The method according to claim 7, further comprising the step of detecting the existence of a communication fault related to the second network, wherein the step of detecting the existence of a communication fault related to the second network further comprises the steps of:

transmitting a connectivity verification packet at a third connectivity verification rate to a connectivity verification server residing on the second network;

waiting for a third amount of time after transmitting the connectivity verification packet; and detecting that no reply for the connectivity verification packet is received before the expiration of the third amount of time, and in response registering a fault in the second network.

11. The method according to claim 7, wherein the step of detecting the existence of a communication fault related to the first network further comprises the step of periodically checking the port integrity of the first network port.

12. The method according to claim 11, further comprising the step of periodically checking the port integrity of the second network port.

13. A computer-readable medium having computer-executable instructions for performing a method of fault detection and recovery for use on a computing device that is communicatively connected to first and second networks via first and second standard network interfaces having first and second network ports respectively, and that is using a IP routing table for outgoing packet routing, the method comprising the steps of:

establishing the first network as a preferred network for receiving, via the first network port, incoming communications to the computing device;

transmitting a connectivity verification packet at a first connectivity verification rate to a connectivity verification server residing on the first network;

waiting for a first amount of time after transmitting the connectivity verification packet;

detecting that no reply for the connectivity verification packet is received before the expiration of the first amount of time, and in response registering a fault in the first network;

altering an entry in the IP routing table for outgoing packet routing such that the entry, which indicates the first network port as a default port, is changed to indicate the second network port as a default port;

causing to be transmitted via the first and second network ports a new gateway packet announcing that incoming communications to the computing device should designate the second network port as a gateway to the computing device; and establishing a second connectivity verification rate for transmitting a connectivity verification packet to the connectivity verification server residing on the first network.

14. The computer-readable medium according to claim 13, wherein the method further comprises the steps of:

transmitting a connectivity verification packet at the second connectivity verification rate to the connectivity verification server residing on the first network;

waiting for a second predetermined amount of time after transmitting the connectivity verification packet; and detecting receipt of a reply to the connectivity verification packet before the expiration of the second predetermined amount of time, and in response registering a recovery of the first network and causing to be transmitted via the first and second network ports a new gateway packet announcing that incoming communications to the computing device should designate the first network port as a gateway to the computer.

15. The computer-readable medium according to claim 14, wherein the first connectivity verification rate is greater than the second connectivity verification rate.

16. The computer-readable medium according to claim 14, wherein the first connectivity verification rate is equal to the second connectivity verification rate.

17. A computer-readable medium having computer-executable instructions for performing a method of fault detection and recovery for use on a computing device that is communicatively connected to first and second networks via first and second standard network interfaces having first and second network ports respectively, and that is using a IP routing table for outgoing packet routing, the method comprising the steps of:

establishing the first network as a preferred network for receiving, via the first network port, incoming communications to the computing device;

transmitting a connectivity verification packet at a first connectivity verification rate to a connectivity verification server residing on the first network;

waiting for a first amount of time after transmitting the connectivity verification packet; and detecting that no reply for the connectivity verification packet is received before the expiration of the first amount of time, and in response registering a fault in the first network;

altering an entry in the IP routing table for outgoing packet routing such that the entry, which indicates the first network port as a default port, is changed to indicate the second network port as a default port;

causing to be transmitted via the first and second network ports a new gateway packet announcing that incoming communications to the computing device should designate the second network port as a gateway to the computing device;

transmitting a connectivity verification packet at a third connectivity verification rate to a connectivity verification server residing on the second network;

waiting for a third amount of time after transmitting the connectivity verification packet; and detecting that no reply for the connectivity verification packet is received before the expiration of the third amount of time, and in response registering a fault in the second network.

* * * * *